Jan. 6, 1959 F. A. QUIROZ 2,867,124
TORQUE DEVICE FOR LIQUID CONTROL
Filed Aug. 29, 1957 2 Sheets-Sheet 1
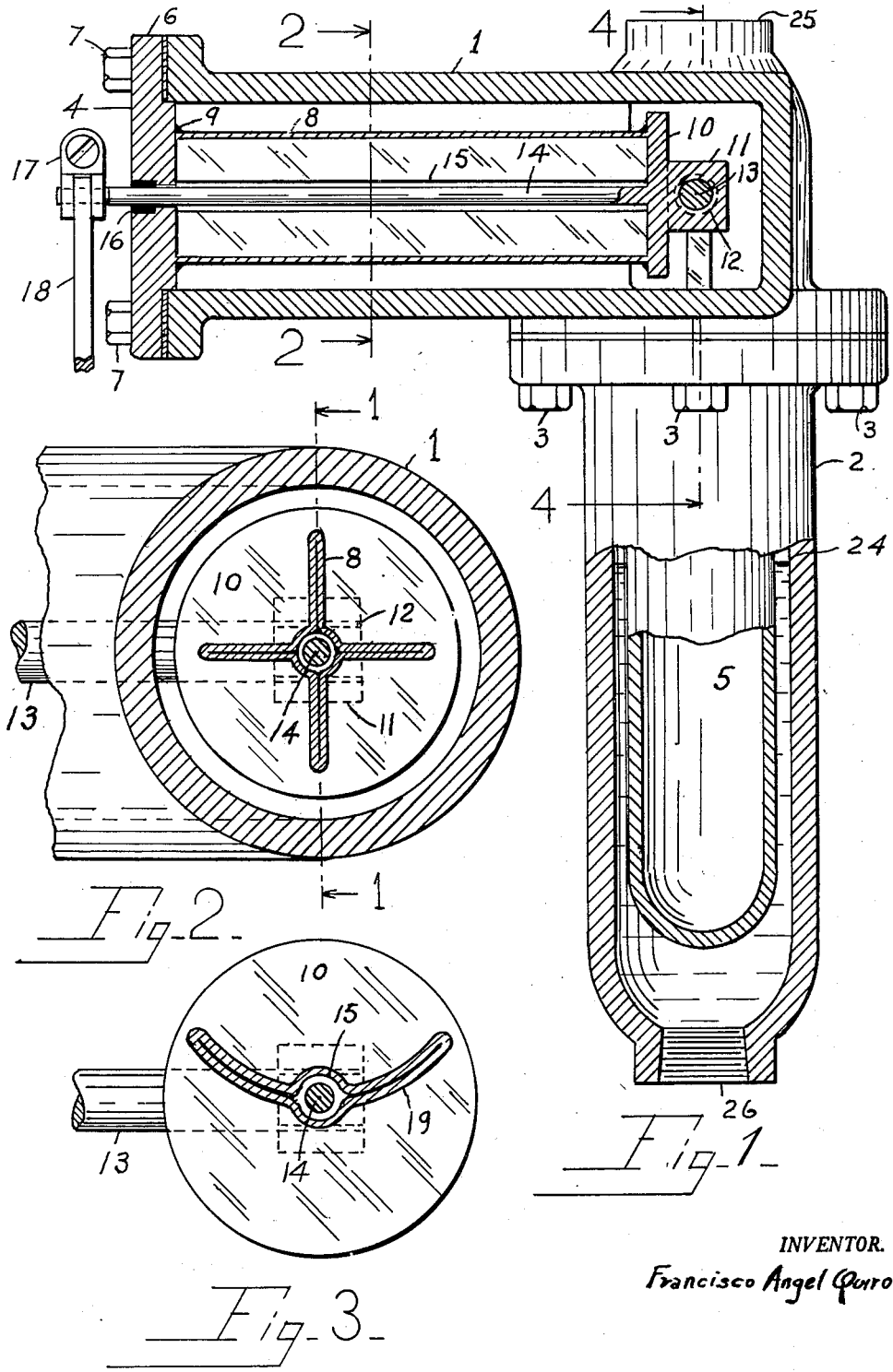
INVENTOR.
Francisco Angel Quiroz

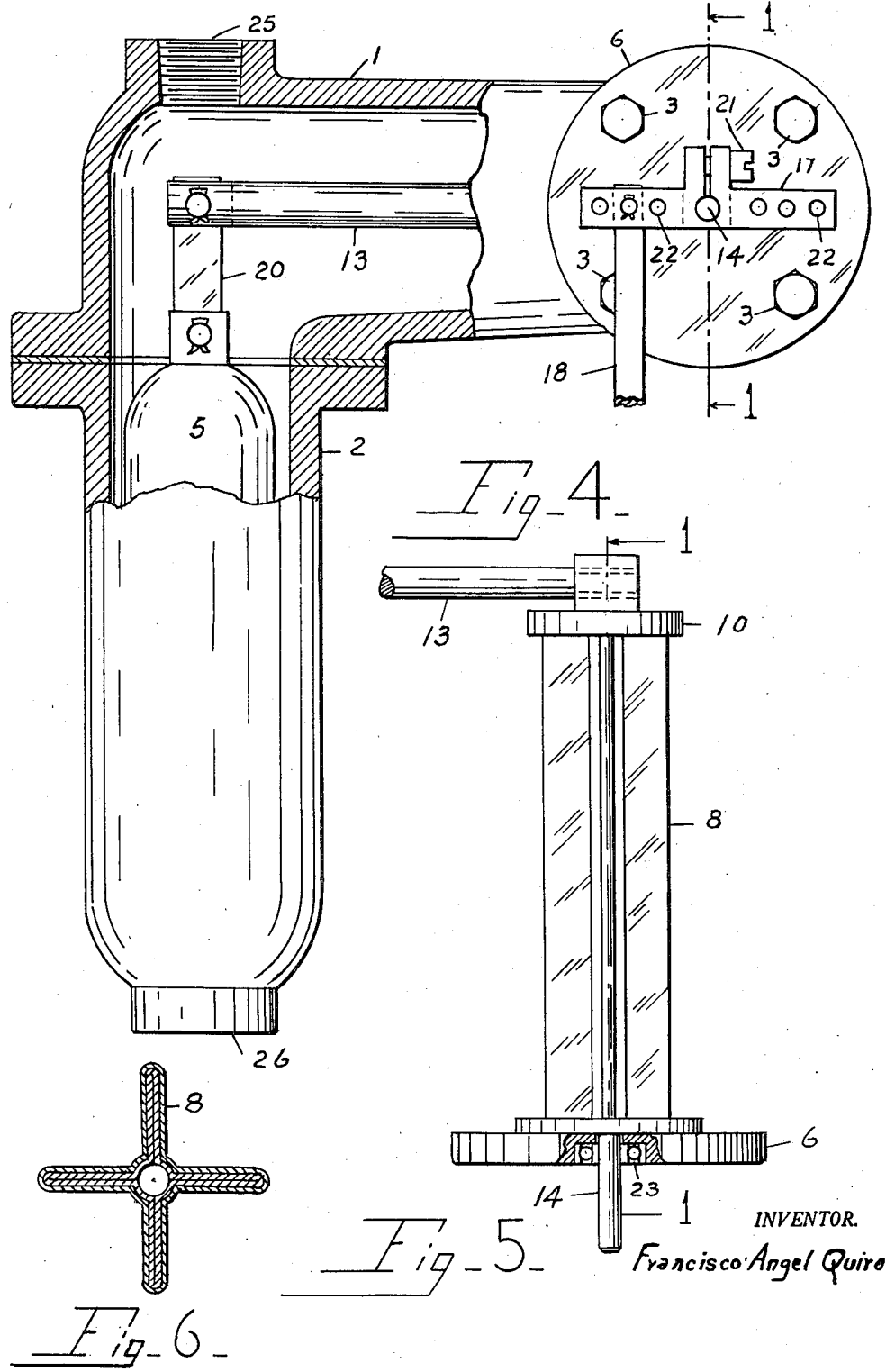

United States Patent Office 2,867,124
Patented Jan. 6, 1959

2,867,124

TORQUE DEVICE FOR LIQUID CONTROL

Francisco Angel Quiroz, Newark, N. J.

Application August 29, 1957, Serial No. 680,949

4 Claims. (Cl. 74—18.1)

This invention relates to devices for transmitting partial rotary movement from a driver member to a driven member with a minimum amount of friction, and at the same time provide frictionless sealing means, to prevent any fluid under pressure from passing from the driver member chamber to the driven member chamber or to the atmosphere, as required in a liquid level control apparatus.

The object of this invention is to provide an improved type of torque mechanism, that will be useful not only in a liquid level device, but that will be of general use in many kinds of devices or mechanisms, that will require the transmission of a torsion movement under similar conditions to the one I show in the liquid level control device, described in my patent application No. 663,860, April 29, 1957.

Another object is to provide an improved type of torque mechanism, that will be simpler in construction with less component parts, will be of superior action and efficiency in practical use and less expensive to manufacture and assemble, will be more compact and take less room than the one shown in the above mentioned application.

A further object is in particular, to eliminate the torque tube, the plurality of resilient members and the bearings which now are used as component parts in similar devices and substitute a single resilient member that will perform the work of the combination of all the above mentioned parts.

This invention accordingly consist in the features of construction, combination of elements and arrangement of parts as will be exemplified in the structure to be hereinafter described and in the scope of the application of which will be indicated in the following claims.

To better illustrate the function and better demonstrate the performance of this device, I have chosen to show it installed in combination with a liquid level control housing, and connected with a displacement float.

In the accompanying drawings in which are shown by way of illustration several of the possible embodiments of my invention:

Fig. 1 is a transverse vertical sectional view of the torque mechanism as seen along the line 1—1 in Figures 2, 4, and 5, and showing in elevation and in fragmentary vertical section part of the float and the float housing.

Fig. 2 is a cross vertical sectional view as seen along the line 2—2 in Figure 1, showing the cross section of the resilient torsion member, the operating rod, the torque mechanism housing, and showing in elevation the rotary disk member.

Fig. 3 is a cross sectional view of an alternate construction of the torsion resilient member and the operating rod, showing in elevation the rotary disk and part of the driving lever.

Fig. 4 is a vertical view partly in elevation and partly in section as seen long line 4—4 in Fig. 1, of the float housing, showing part of the float and driving lever, and also in elevation the fixed disk of the resilient member and the operating cross bar.

Fig. 5 is a top view in elevation of the complete torque unit, as seen from the top of Fig. 1, showing in section part of the fixed disk and an alternate type of operating rod bearing.

Fig. 6 is a cross section of the resilient member showing a double lamination construction.

Similar reference characters refer to similar parts throughout the several views of the drawings.

Referring first to Fig. 1, I show a liquid level control housing made in two parts, the upper part 1 and the lower part 2, which are connected to each other by means of the bolts 3. The upper part 1, contains the torque unit 4 and the lower part 2, contains the float 5. The torque unit comprises the fixed disk 6 which is provided with a suitable number of holes, to be secured to the housing 1 by means of the bolts 7, and it provides the base to which the torsion resilient member 8 is secured at 9, preferably by welding. The other end of the torsion resilient member is welded to the torque disk 10 which has a projection 11 with a threaded hole 12 to engage with one end of the float lever 13. On the opposite side the torque disk 10 has a bar 14 welded to it, projecting perpendicular to its face and extending coaxially through the center of the duct 15 formed by the torsion resilient member 8 and passes out through the opening in the center of the disk 6 and out through the graphite bearing 16 to engage the cross bar 17 which operates the rod 18, which in turn may operate any convenient instrument or pilot.

In Fig. 2, I show a preferable form of construction of the torsion resilient member 8, which can be made in many different forms with equal results, as long as it has the following characteristics. It must be made of a special material suitable for high temperature springs, which it has resistance to corrosion and fatigue resistance as well; such as Inconel X or something similar. The construction must be such that it will be flexible and permit a torsion movement of the disk 10 and bar 14 and allow them to rotate at least 20 degrees. But at the same time, it must be rigid and inflexible to prevent any radial or axial movement of the torque disk 10 and bar 14, when a variable force is applied through the lever 13 by the weight of the float 5. In this particular construction as shown in Fig. 2, it can be seen that the torsion resilient member 8, has four preferably straight radial fins formed by corrugations parallel to the axis of duct 15, but it can be made with any suitable number of fins to suit conditions, such as the size of the resilient member and the load that it will have to carry. When the fins are radial the resilient member should not have less than three fins; but it can be constructed with two fins provided they are curved, preferably to form a channel or any other form that will render the resilient member 19 inflexible to radial or axial movement, as it is shown in Fig. 3. It is essential that the resilient member should have an axial duct 15 slightly larger in diameter than the bar 14, to allow said bar to pass through it with no friction. Although the resilient member 8 could be constructed with a solid tube to form the duct and solid radial fins welded to it, it would make the member too rigid to allow a torsion movement or too weak to withstand a radial force. To insure a good performance the resilient member should be preferably made with laminated fins with two or more laminations, and the duct 15 should be preferably split along the fins. The laminations should not be welded to one another, they should be welded only to the discs 6 and 10. This will permit greater torsional flexibility, and will eliminate the necessity of making a too long resilient member, when a greater torsional movement is required.

In Fig. 3, I show a cross section of the resilient member 19 showing an alternate construction, which comprises a central duct with two curved fins, or also, we can say that comprises one curved laminated blade with a duct in the middle. This construction has the same characteristics as the four fins construction shown in Fig. 2, and it will perform just as good. It is flexible to a torsional movement, but it is rigid to any radial or axial movement without any support besides the one provided by the disk 6.

In Fig. 4 I show the level control housing partly in elevation and partly in section as seen along the line 4—4 in Fig. 1. I also show part of the float, the float lever 13, the link 20, the fixed disk 6, the operating bar 14, to which is clamped the cross bar 17 by means of the screw 21. The cross bar is provided with a number of holes 22 on each arm of the bar, to which the rod 18 can be connected, depending on the length of the stroke required and the kind of movement desired, upwards or downwards.

In Fig. 5, I show a plan view in elevation and a small part in section of the complete torque unit, showing an alternate type of bearing 23 to support the outer end of the bar 14. It is a ball bearing instead of the graphite bearing shown in Fig. 1. The torque unit comprises the resilient member 8, the fixed disk 6, the rotary disk 10 and the operating bar 14. All component parts are welded together and form one single unit. The only detachable parts are the bearing 23 and the float lever 13 which is screwed in the projection 11 of the disk 10.

In Fig. 6, I show a cross section of the resilient torsion member 8, showing a four lamination fins construction. It can be made with any convenient number of laminations. The greater the number of laminations, the greater the flexibility and the greater the degrees of torsion that can be obtained. Also the greater the sensitivity of the device to correspond to small variations of torque.

The operation of the torque unit in a liquid level control device as shown in the accompanying drawings is as follows. Suppose that the level control device housing is connected to the boiler by means of the ports 25 and 26, so that the liquid level would be at point 24 in Fig. 1. The float 5 which is heavier than the liquid is always partly immersed in it, and is supported at one end of the lever 13, which is attached at the other end to the projection 11 of the torque disk 10. As the torque unit as shown in Fig. 5, is bolted to the housing 1 by the bolts 7, the float is supported by the torque unit by means of the torsion resilient member 8 and the lever 13. It is clear that any force exerted by the float 5 and the lever 13 will tend to torsion the resilient member 8 in proportion to the amount of force provided by the float 5. The force will be equal to the weight of the float 5 and the lever 13 minus the weight of the liquid displaced by the partial or total submersion of the float 5. It is clear therefore, that any variation in the liquid level will cause a variation in the amount of the liquid displaced by the float 5, and consequently a variation of the force exerted on the torsion resilient member 8 by means of the lever 13, and a variation in the rotary movement of the torque disk 10 and the operating bar 14. This variation of movement of the bar 14 is utilized by means of the cross bar 17 and the bar 18 to operate a pilot mechanism which will control and operate the valve that supplies water to the boiler and keeps the water level constant.

It can be seen that the torque unit not only transmits very efficiently and accurately, the amount of force variation exerted by the float inside a high pressure housing, to operate a pilot or another mechanism outside of the housing at atmospheric pressure, or in another housing with a higher or lower pressure, but the transmission of power is done practically without any power loss by friction, as there are no stuffing boxes or bearings supporting the torsion resilient member. The only friction is the one caused by the very small ball bearing 23, which centers the operating bar 14 in the duct 15, and that is negligible.

Another characteristic of the construction of the resilient member is, that although it is constructed with thin laminated metal, it can withstand great pressure, because the only place where it could collapse would be in the duct 15, and it has a very small diameter and can resist a very great pressure.

It is clearly demonstrated that in this invention, a single torsion resilient member 8 takes the place and performs the function of the four spring members and the torsion tube that I show in my above mentioned patent application No. 663,860, filed April 29, 1957. It provides frictionless sealing means to prevent any leakage of fluid under pressure passing out of the housing 1. It provides a sealed fluidless passage 15 to allow the operating bar 14 to extend outside of the housing to transmit power without the necessity of using a torque tube. It provides an axially rigid support without bearings to the rotary disk 10, but allows it to rotate freely against a variable torque. And finally it provides a greater flexibility which allows a greater torsional movement against a progressive torsional torque.

It can be seen that this device can have many different applications and can be made in many different sizes to suit the conditions required in many different apparatus.

As many possible embodiments may be made of the above invention and many changes may be made in the embodiment above set forth, it is to be understood that all matter hereinbefore set forth or shown in the accompanying drawings is to be interpreted as illustrated and not in a limiting sense.

What I claim is:

1. A device for transmitting motion from a moving element within a housing to a movable element outside of the housing, comprising an elongated tube of relatively small diameter, formed by a number of longitudinal channels with a curvature corresponding to the diameter of said tube, said channels being kept in position by a number of longitudinal fins or blades of the same length of said tube, said fins or blades being formed by material extending radially from the edge of one channel and folded back on itself in close contact, to connect and support the edge of another channel, said fins or blades being of a width substantially greater than the diameter of the tube; a supporting disc having an aperture of the same diameter of said tube and adapted to be welded to one end of said tube and fins or blades, to close all passage to the inside of said tube, except through the supporting disc aperture; a second disc welded to the other end of said tube and fins or blades, to close all passage from the inside of the housing to the interior of said tube; a bar of smaller diameter than the diameter of the inside of said tube, welded perpendicularly to the welded face of said second disc and extending concentrically through said tube and the aperture in the supporting disc; a lever bar extending radially from the second disc; means for mounting the supporting disc in the housing, means for imparting motion to said lever bar from the moving element within the housing in order to rotate the second disc and the bar extending therefrom and means for transmitting motion from the portion of the bar extending out of the housing to the movable element outside of the housing.

2. A device for transmitting motion from a moving element within a housing to a movable element outside of the housing, comprising a supporting disc having a relatively small aperture; a tube of resilient material of practically the same diameter as said aperture, and having sufficient length so that it can be twisted with a relatively light force on its axis without being distorted; a number of fins or blades of a width substantially greater than the diameter of the tube, extending from one end to the other end of the tube and projecting radially from the outside of said tube; one end of said tube and fins and blades being welded to said supporting disc in a perpendicular position to the face of said disc and with the outlet of said tube in line with the aperture in said disc; a second disc welded to the other end of said tube and fins or blades in a parallel position to the supporting disc and closing the entrance to said tube; a bar of smaller diameter than the inside of said tube, having one end welded to the second disc and extending concentrically through the inside of said tube and through the aperture of the supporting disc; a lever bar extending radially from said second disc; means for imparting motion to said bar to partially rotate said second disc by means of the moving element within the housing, and means for imparting motion to a movable element outside of the housing by the portion of the bar extending out of the housing.

3. In a device of the character described, as claimed in claim 1, in which the tube between the supporting disc and the second disc, is formed only by two elongated channels with a half circular cross section, that are kept together in a position to form said tube, by two fins or blades having a curved cross section and having a width of more than twice the diameter of the tube, and are formed by material extending outward from the sides of one channel and folded back in close contact on itself to connect the sides of the second channel.

4. In a device of the character described, as claimed in claim 1, in which the tube and ribs or blades which connect the supporting disc and the second disc, are constructed with two or more unbonded layers of thin material superimposed on each other, in order to increase its flexibility to a torsional movement by a light force and to increase its resistance to a radial force and to high pressure.

References Cited in the file of this patent

UNITED STATES PATENTS

| | | |
|---|---|---|
| 1,973,004 | Langworthy et al. | Sept. 11, 1934 |
| 2,353,641 | Brockett | July 18, 1944 |
| 2,373,473 | Brockett | May 22, 1945 |
| 2,699,070 | Cottle | Jan. 11, 1955 |

FOREIGN PATENTS

| | | |
|---|---|---|
| 1,070,298 | France | Feb. 17, 1954 |